Patented Sept. 29, 1931

1,825,533

UNITED STATES PATENT OFFICE

ALBERT LOEBEL, OF AMSTERDAM, NETHERLANDS, ASSIGNOR TO DE BATAAFSCHE PETROLEUM MAATSCHAPPIJ, OF THE HAGUE, NETHERLANDS

METHOD OF PRODUCING HIGH-MELTING PARAFFIN AND CERESINE

No Drawing. Application filed October 22, 1928, Serial No. 314,328, and in the Netherlands November 15, 1927.

It is known that paraffin may be obtained from distilling those oils which have either a paraffin or a mixed paraffin-asphalt base.

Mixed base oils may only be distilled to a certain amount, for if the distillation is carried further the distillates are very difficult to handle; as a rule, therefore, the distillation is carried on until products are distilled over, which have a congealing point of more than 60° C., the residue being left in the still. The residue comprises a mixture of asphalt and the greater part of the hard paraffin contained in the raw material. In its original state this residue cannot be worked, but since it contains very valuable products many attempts have been made to find a rational and suitable method for treating it, in order to obtain the said valuable products. These attempts have not yet met with much success.

I found that the residue described above may be rationally treated and valuable products obtained therefrom in a comparatively easy manner in adding, before or during the distillation of one or more hydrocarbons alone or in mixture with other substances, which are soluble in liquid $SO_2$, for example Edeleanu-extract coal tar and/or cracking residue as is obtained by the well-known cracking process.

Example I

From an East-Indian paraffinous crude oil, the benzine, kerosene, gas oil, and paraffin oil fractions are separated by distillation with steam until the last fraction distilled off has a congealing point of approximately 53° C. To the residue remaining in the still is mixed say an equal part of Edeleanu-extract of a lubricant oil fraction, and after which distilling is continued until practically all the hard paraffin is separated. The paraffin distills out and can be further treated in known manner while the residue left in the still is a very useful asphalt.

Example II

The same residue of a primary distillation as contemplated in Example I is mixed with an equal quantity of Dubbs cracking residue, and is then steamed-distilled until nearly all the hard paraffin is distilled over. There remains a residue in the still, which residue is a hard asphalt. The distillation may be further treated in known manner.

It is obvious that the invention is susceptible to certain modifications, and it is intended that it be limited only by the scope of the appended claims.

1. A process of producing high melting paraffin from the distillation residue of mixed base oil obtained by distilling off the fractions boiling up to approximately 400° centigrade, comprising adding to the said residue one or more hydrocarbons boiling above 200° centigrade which are materially soluble in liquid $SO_2$, subsequently distilling the mixture and separating the hard paraffin from the distillate obtained.

2. A process of producing high melting paraffin from the distillation residue of mixed base oil obtained by distilling off the fractions boiling up to approximately 400° centigrade, comprising adding to the said residue Edeleanu-extract boiling above 200° centigrade, subsequently distilling the mixture and separating the hard paraffin from the distillate obtained.

In testimony whereof I have signed my name to this specification.

ALBERT LOEBEL.